United States Patent [19]
Tsuchida et al.

[11] Patent Number: 5,273,346
[45] Date of Patent: Dec. 28, 1993

[54] BRAKING SYSTEM FOR MOTORCYCLE

[75] Inventors: Tetsuo Tsuchida; Kanau Iwashita, both of Saitama, Japan

[73] Assignee: Honda Giken Kogyo Kabushiki Kaisha, Tokyo, Japan

[21] Appl. No.: 898,968

[22] Filed: Jun. 12, 1992

[30] Foreign Application Priority Data

Jun. 14, 1991 [JP] Japan .................. 3-143347

[51] Int. Cl.$^5$ .................. B60T 8/26; B60T 17/10
[52] U.S. Cl. .................. 303/2; 303/9.64; 303/113.5; 303/DIG. 2; 188/106 P
[58] Field of Search .................. 188/105, 106 P, 344, 188/345; 303/2, 9.62, 9.64, 9.71–9.75, 113.5, DIG. 2, DIG. 3, DIG. 4

[56] References Cited
U.S. PATENT DOCUMENTS

| | | | |
|---|---|---|---|
| 4,239,294 | 12/1980 | Burgdorf | 303/9.64 |
| 4,274,518 | 6/1981 | Berisch | 188/344 |
| 4,465,322 | 8/1984 | Hayashi | 303/9.64 |
| 4,494,800 | 1/1985 | Hayashi | 303/9.64 |
| 4,598,954 | 7/1986 | Hayashi | 303/9.61 |
| 4,923,027 | 5/1990 | Hayashi et al. | 180/219 |
| 5,219,211 | 6/1993 | Tsuchida et al. | 303/9.64 |

FOREIGN PATENT DOCUMENTS

| | | |
|---|---|---|
| 3011138 | 3/1980 | Fed. Rep. of Germany . |
| 2917526 | 11/1980 | Fed. Rep. of Germany . |
| 3729145 | 3/1988 | Fed. Rep. of Germany . |
| 3914051 | 10/1990 | Fed. Rep. of Germany . |
| 2283816 | 4/1976 | France . |
| 140155 | 8/1984 | Japan . |
| 202964 | 11/1984 | Japan . |
| 2134199 | 8/1984 | United Kingdom . |
| 2134200 | 8/1984 | United Kingdom . |
| 9006871 | 6/1990 | World Int. Prop. O. . |

Primary Examiner—Robert J. Oberleitner
Assistant Examiner—Alfred Muratori
Attorney, Agent, or Firm—Lyon & Lyon

[57] ABSTRACT

In a braking system for a motorcycle, a brake includes a plurality of applicators which are respectively operated by hydraulic braking pressures fed from first and second actuators, and a common antilock modulator is provided for controlling and reducing the hydraulic braking pressures from the first and second actuators. This makes the braking system having antilock control function simplified in structure.

18 Claims, 10 Drawing Sheets

BRAKING SYSTEM FOR MOTORCYCLE

BACKGROUND OF THE INVENTION

The field of the present invention is braking systems for motorcycles, and more particularly, braking systems of a type equipped with a modulator operable to reduce hydraulic braking pressure in order to avoid wheel lock.

Brake systems for motorcycles are known which perform an antilock function through provision of antilock pressure reduction mechanisms. Such mechanisms have been interposed in brake lines supplying hydraulic braking pressure to front and rear brake cylinders. An electronic control unit controls the operation of such pressure reduction mechanisms. Reference is made to Japanese Patent Application Laid-open No. 140155/84 and its equivalent, British Publication No. 2 134 200B, for example.

In such braking systems, brake cylinders for each of the front and rear wheels together may be interconnected such that they can be actuated by a brake lever and/or brake pedal. Hydraulic braking pressure is supplied to these brake cylinders through a single free line system at the final stage.

In such systems, each of the front and rear brakes may include more than one means, such as pots, for applying a braking force. With such an arrangement, part of the means for applying braking force are actuated by a hydraulic braking pressure generated by a brake lever while the remainder of the means for applying braking force are actuated by a hydraulic braking pressure generated by a brake pedal. In this way, it becomes possible to control the braking forces for the front and rear wheels delicately and minutely. A brake system constructed in the above manner, however, necessitates provision of two antilock pressure reduction mechanisms for each of the front and rear brake cylinders and this results in an increase in the number of parts and the cost and makes the structure complicated.

A braking system not employing antilock modulators has been developed which is capable of braking both the front and rear wheels by operation of either of a first input means operated by a hand operated element and a second input means operated by a foot operated element. The system is designed for both of the front and rear wheels to be controlled by one or both of the first and second input means operated by hand operated and foot operated elements, respectively. The system provides braking force distribution between the front and rear brakes in accordance with respective forces of the input means. Reference is made to copending U.S. patent application Ser. No. 673,209, filed Mar. 20, 1991 and entitled Braking System for Motorcycle, the disclosure of which is incorporated herein by reference.

SUMMARY OF THE INVENTION

The present invention provides an antilock brake system for motorcycles having brake means actuated by hydraulic braking pressure supplied from a plurality of input means with reduced parts and cost. The brake system includes a wheel brake having a plurality of brake applicators which may be controlled by hydraulic braking pressures from multiple actuators. An antilock modulator provided commonly for the multiple actuators reduces the hydraulic braking pressures supplied from the multiple actuators to the wheel brake when the braking force applied to the wheel becomes excessive.

With this arrangement, a single common antilock modulator may be used for reducing the hydraulic braking pressures from the multiple actuators and hence, as compared with an arrangement where antilock modulators are employed for respective actuators, the number of parts and cost can be reduced remarkably and the structure simplified.

In another aspect of the present invention, multiple actuators are directed to both the front and rear wheel brakes with independent antilock modulators interposed between the multiple actuators and each wheel brake. The system may then operate such that the hydraulic braking pressure fed to the front brake and the hydraulic braking pressure fed to the back brake are subjected to pressure reduction control by the associated modulators independently of each other. This is advantageous in that even when the antilock modulator on the front wheel, for example, is being operated in order to prevent the braking force for the front wheel from becoming excessively large, the braking force for the rear wheel can be separately controlled delicately and minutely.

The above and other objects, features and advantages of the invention will become apparent from the following detailed description of a preferred embodiment, taken in conjunction with the accompanying drawings.

BRIEF DESCRIPTION OF THE DRAWINGS

FIGS. 1 to 10 illustrate an embodiment of the present invention, wherein

FIG. 1 is a general plan view of a motorcycle equipped with a braking system of the embodiment;

FIG. 2 is an illustration of the entire construction of the braking system;

FIG. 3 is an enlarged view of a portion indicated by numeral 3 in FIG. 2;

FIG. 4 is a sectional view taken along line 4—4 in FIG. 3;

FIG. 5 is a sectional view taken along line 5—5 in FIG. 3;

FIG. 6 is an enlarged view of a portion indicated by numeral 6 in FIG. 2;

FIG. 7 is an enlarged view of a portion indicated by numeral 7 in FIG. 2;

FIG. 8 is an enlarged view of a portion indicated by numeral 8 in FIG. 2;

FIG. 9 is a sectional view taken along line 9—9 in FIG. 8; and

FIG. 10 is a graph illustrating braking force distribution characteristics for front and rear wheels of the embodiment.

DESCRIPTION OF PREFERRED EMBODIMENT

Figure 1:
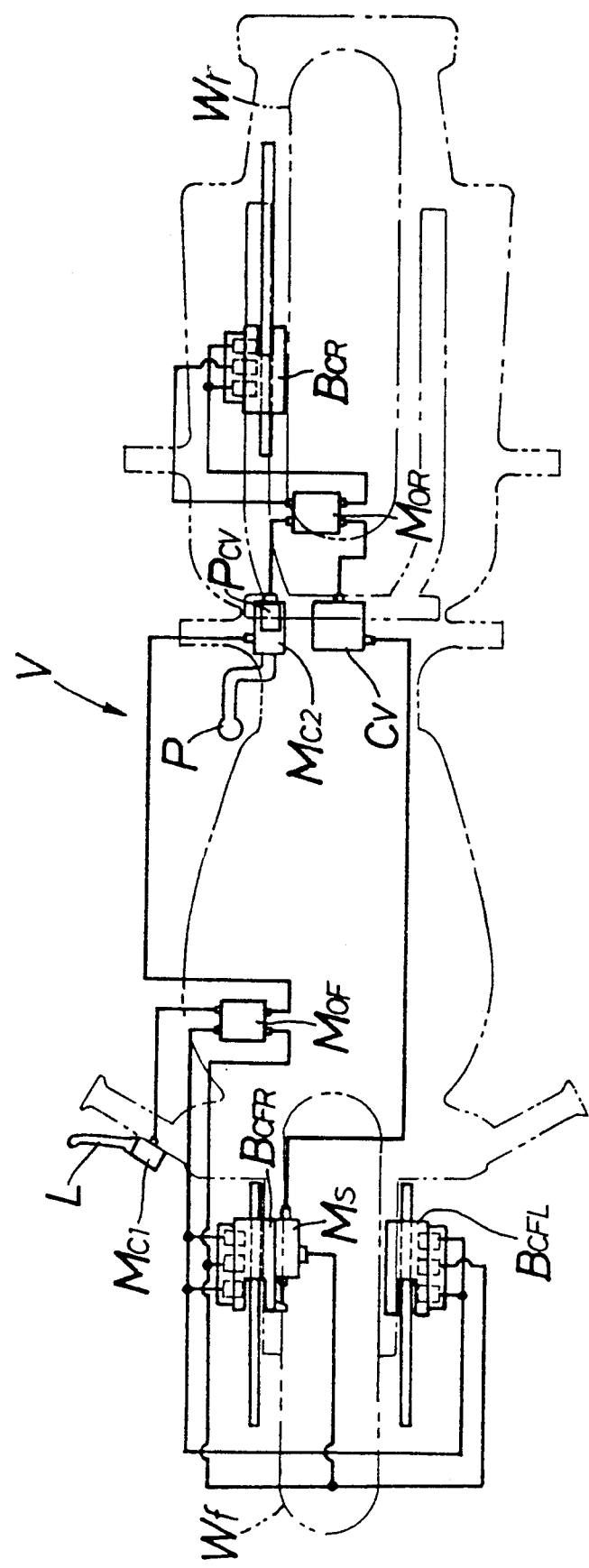
Figure 2:
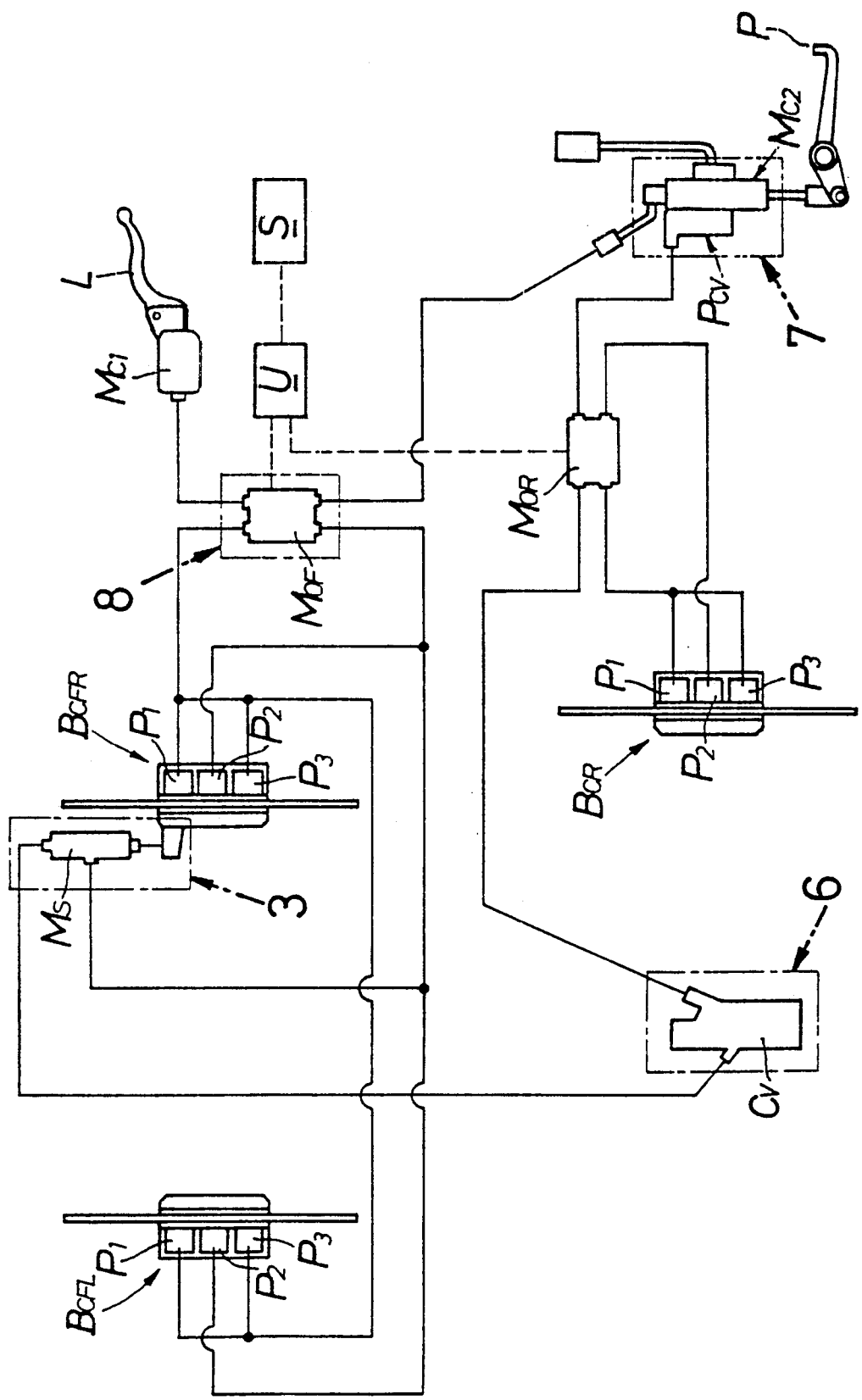

Referring to FIGS. 1 and 2, a motorcycle V includes a brake lever L as a hand operated element mounted on a handlebar, and a brake pedal P as a foot operated element mounted on a vehicle body frame. Left and right brake cylinders $B_{CFL}$ and $B_{CFR}$ are mounted on a front wheel Wf and each cylinder includes three pots, i.e., a front pot $P_1$, a central pot $P_2$ and a rear pot $P_3$. A first master cylinder $M_{C1}$ operated by the brake lever L is connected to two pots $P_1$ and $P_3$ of the left brake cylinder $B_{CFL}$ as well as to two pots P1 and P3 of the right brake cylinder $B_{CFR}$ through an antilock modulator $M_{OF}$ for the front wheel. The antilock modulator $M_{OF}$ is controlled by an electronic control unit U which is connected with a wheel speed sensor S for sensing the onset of wheel lock of either the front wheel Wf or rear wheel Wr. A mechanical servo mechanism Ms is mounted on the right brake cylinder $B_{CFR}$ of the front wheel Wf for generating a hydraulic braking pressure by utilizing a braking force applied to the front wheel Wf. The hydraulic braking pressure generated by the mechanical servo mechanism Ms is transmitted to two of three pots, i.e., pots $P_1$ and $P_3$ of a front pot $P_1$, a central pot $P_2$ and a rear pot $P_3$ of a brake cylinder $B_{CR}$ for the rear wheel Wr, through a pressure control valve Cv and an antilock modulator $M_{OR}$ for the rear wheel Wr. The modulator $M_{OR}$ has a construction identical with that of the front wheel modulator $M_{OF}$.

A second master cylinder $M_{C2}$ operable by the brake pedal P is connected to the pot $P_2$ of the left brake cylinder $B_{CFL}$ as well as the pot $P_2$ of the right brake cylinder $B_{CFR}$ of the front wheel Wf through the front antilock modulator $M_{OF}$, and also to the mechanical servo mechanism Ms. A proportioning pressure reduction valve $P_{CV}$ is integrally provided on the second master cylinder $M_{C2}$ and is connected to the pot $P_2$ of the brake cylinder $B_{CR}$ for the rear wheel Wr via the rear antilock modulator $M_{OR}$.

Figure 3:
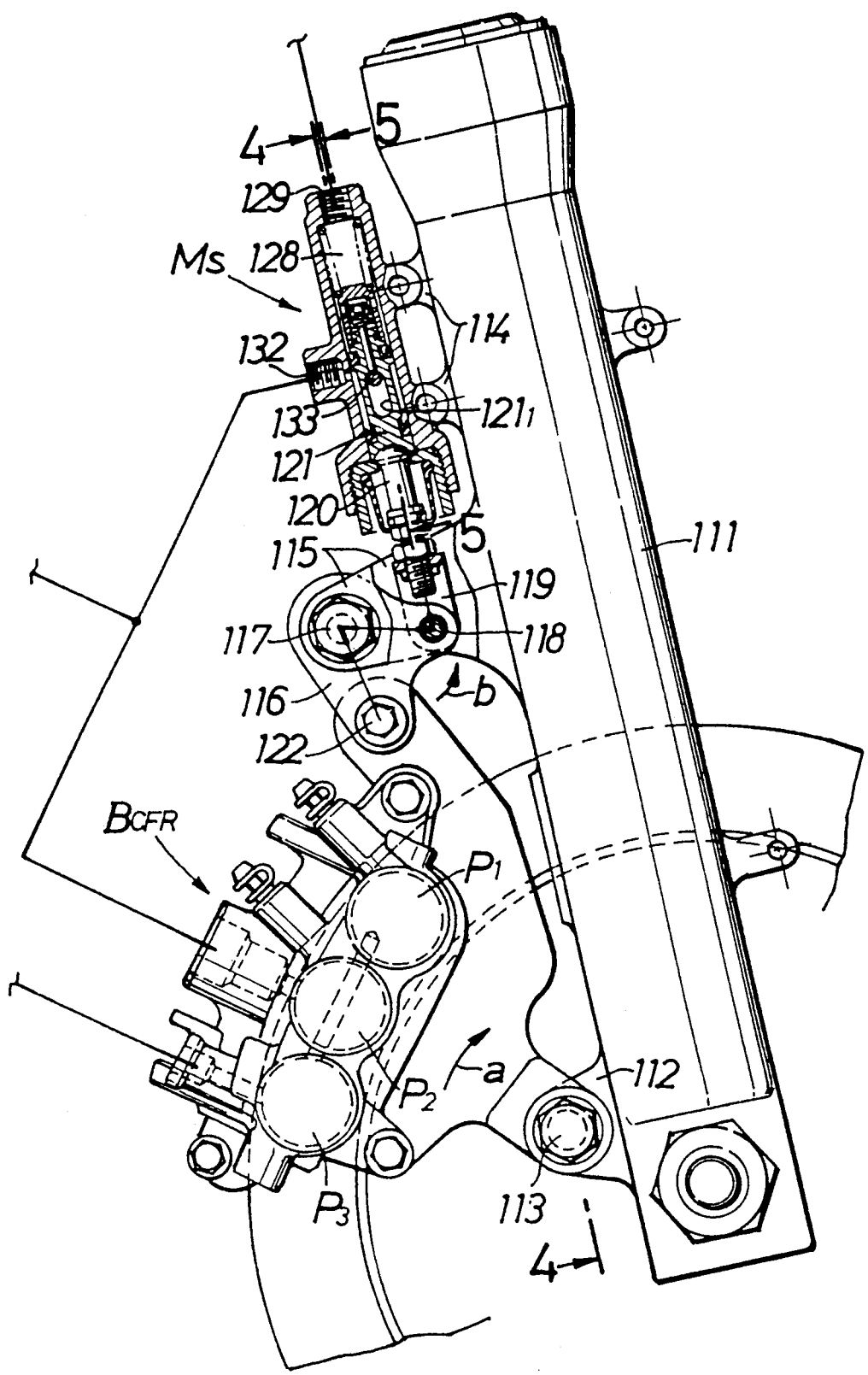
Figure 4:
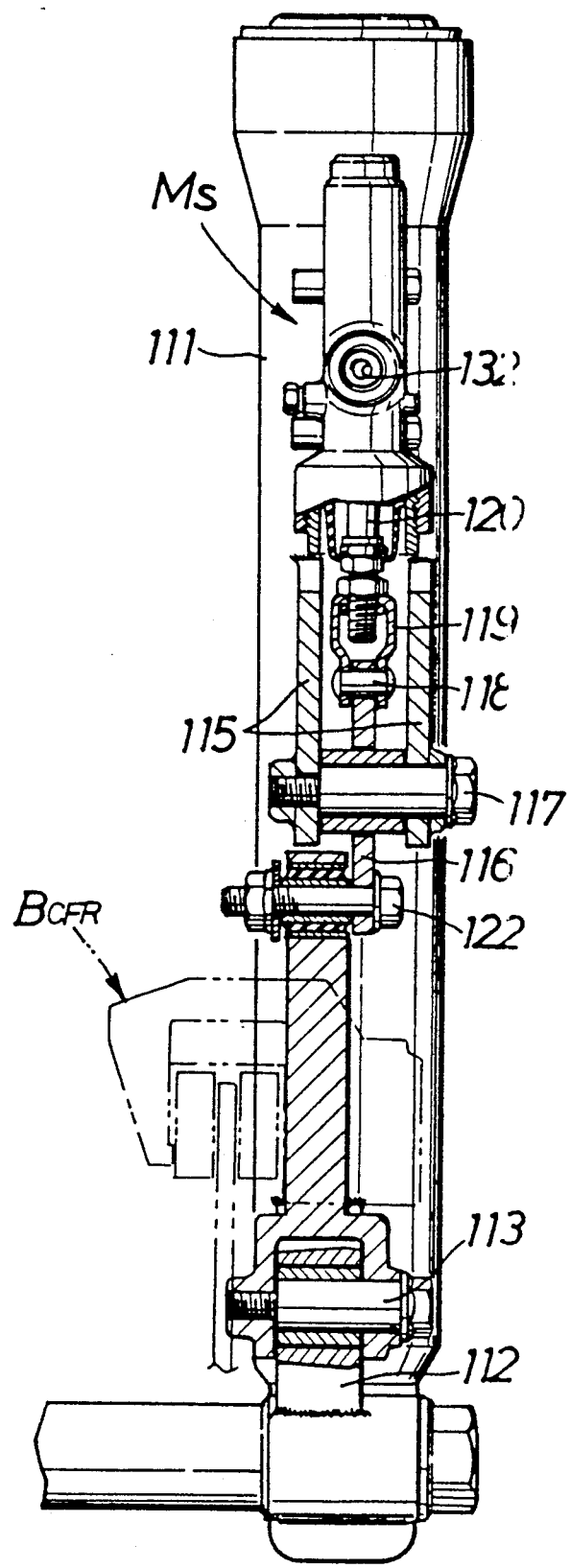

As shown in FIGS. 3 and 4, the right brake cylinder $B_{CFR}$ of the front wheel Wf is pivotally supported by a pin 113 on a bracket 112 which is fixedly mounted on a lower portion of a front fork 111. On an upper portion and along a rear surface of the front fork 111, the mechanical servo mechanism Ms having a substantially cylindrical shape in a vertical orientation is mounted via a pair of brackets 114. An L-shaped link 116 is pivotally supported by a pin 117 on a bracket 115 which is fixedly mounted on the front fork 111. A connecting member 119 is pivotally mounted by a pin 118 on one of opposite ends of the link 116 and is integrally formed with a rod 120. An upper end of the rod 120 abuts against a lower end of a piston 121 of the mechanical servo mechanism Ms. The other end of the link 116 is pivoted to an upper end of the brake cylinder $B_{CFR}$ through a pin 122. Thus, if the brake cylinder $B_{CFR}$ is swung in a direction of an arrow a by braking the front wheel Wf, the link 116 is swung in a direction of an arrow b to urge the rod 120 upwardly, thereby causing the mechanical servo mechanism Ms to produce a secondary hydraulic braking pressure.

Figure 5:
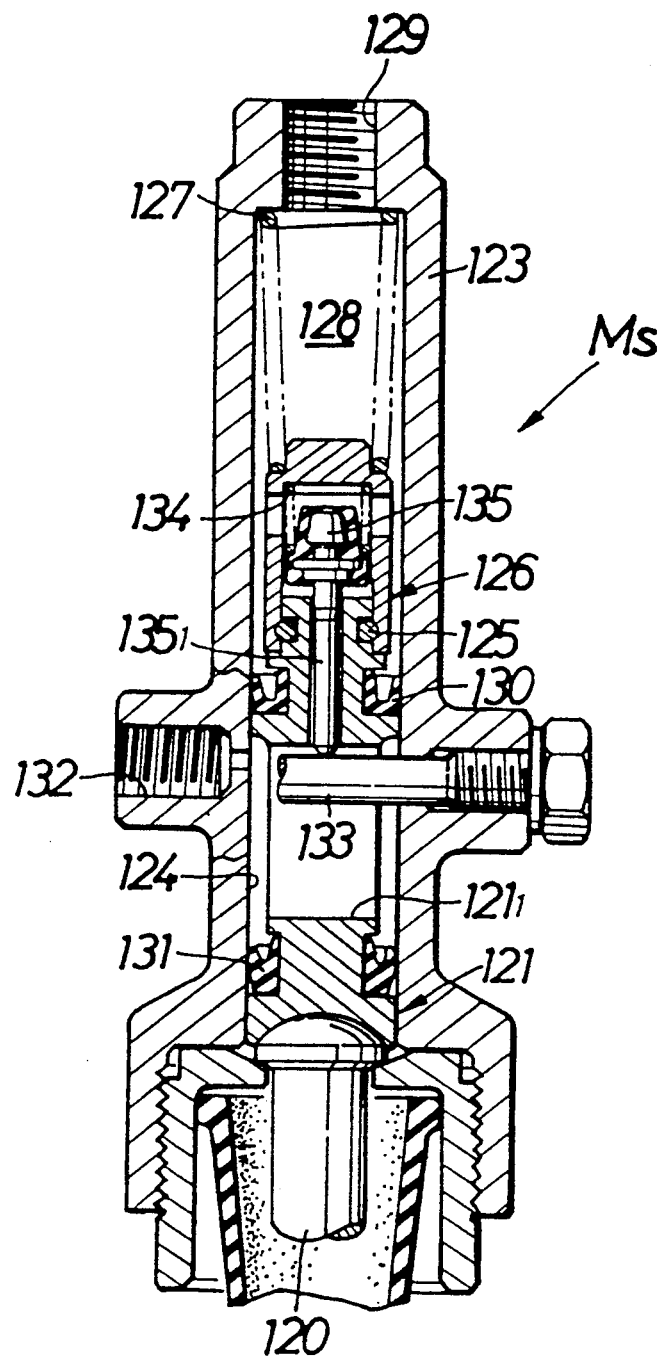

As can be seen from FIG. 5, a cylinder portion 124 is formed in a casing 123 of the mechanical servo mechanism Ms, and a valve guide 126 is coupled through an O-ring 125 to an upper end of the piston 121 which is slidably received in the cylinder portion 124. An oil chamber 128 is defined at an upper portion of the cylinder portion 124 and contains therein a return spring 127 for biasing the valve guide 126 and the piston 121 downwardly. An output port 129 is provided at an upper end of the oil chamber 128.

A primary cup 130 and a secondary cup 131 are mounted on front and rear ends, or upper and lower ends of the piston 120, respectively, and the casing 123 is provided with a secondary port 132 located between the cups 130 and 131 and connected to the second master cylinder $M_{C2}$. At an intermediate portion of the piston 121, an elongated groove $121_1$, is provided extending radially therethrough, and a stopper bolt 133 threadably mounted in the casing 123 is slidably and loosely fitted into the elongated groove $121_1$.

A valve 135 is contained in a loosely fitted manner within the valve guide 126 and is biased by a valve spring 134 so as to abut against a top surface of the piston 121 and assume its closed position. A leg $135_1$ is integrally formed on the valve 135 so as to extend through a central portion of the upper portion of the piston 121 into the elongated groove $121_1$ and to abut against the stopper bolt 133. Thus, When the piston 121 is being retracted to a position shown in FIG. 5 by a repulsive force of the return spring 127, the leg $135_1$ of the valve 135 comes into abutment against the stopper bolt 133 and is urged upwardly thereby, so that the secondary port 132 is put into communication with the oil chamber 128 through a clearance defined around an outer periphery of the valve 135 and an outer periphery of the leg $135_1$. If the piston 121 is slightly urged by the rod 120 upwardly from this state, the leg $135_1$ of the valve 135 is separated away from the stopper bolt 133 so that the valve body 135 is lowered by a repulsive force of the valve spring 134 to cut off the communication between the second port 132 and the oil chamber 128. Thus, if the piston 121 is further raised, a hydraulic braking pressure is generated in the oil chamber 128 and transmitted to the pressure control valve Cv. Therefore, a primary port which has conventionally been required can be eliminated because of the action of the valve 135, serving to prevent the primary cup 130 from being damaged when it passes through such a primary port.

Figure 6:
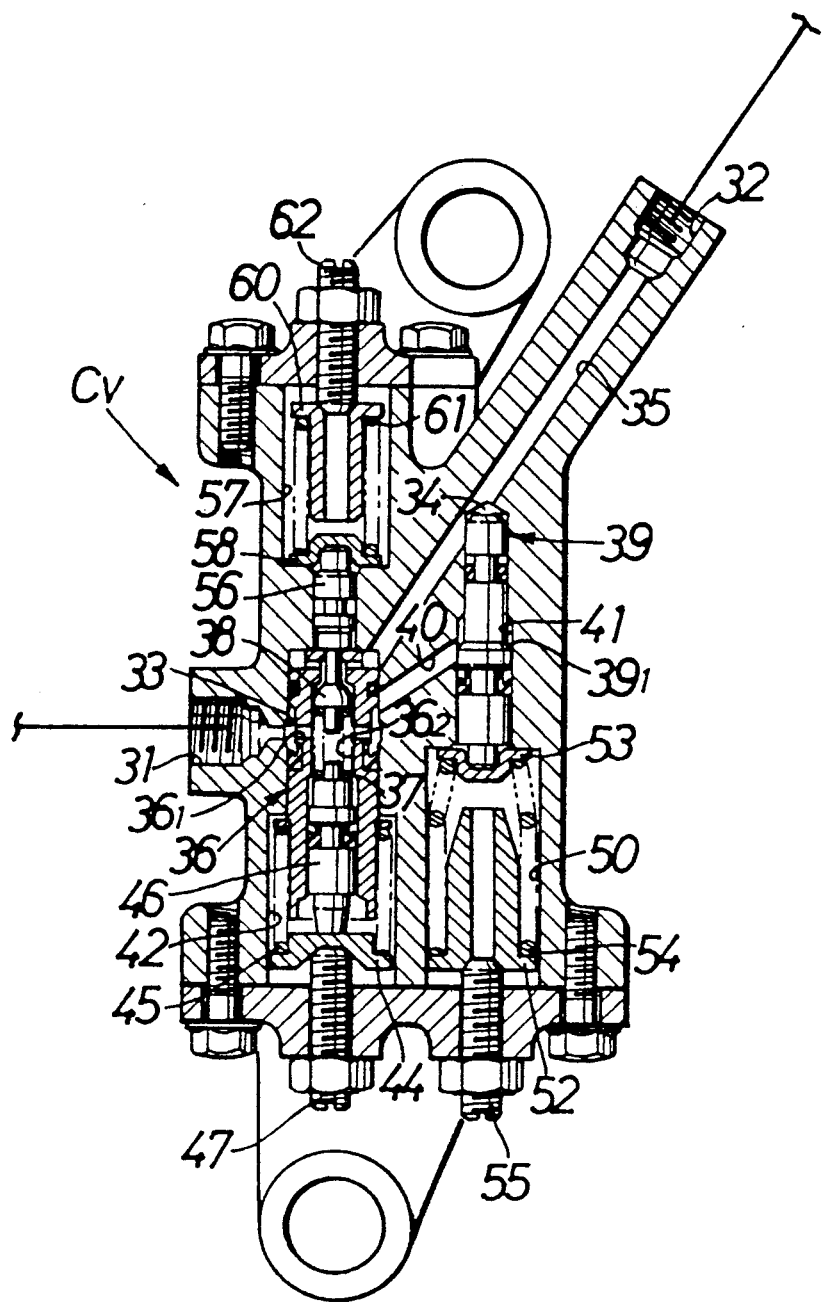

The structure of the pressure control valve Cv will hereinafter be described in detail by reference to FIG. 6. The pressure control valve Cv includes an input port 31 connected to the output port 129 of the mechanical servo mechanism Ms, and an output port 32 connected to the rear modulator $M_{OR}$. A valve chest 33 communicating with the input port 31 and an oil chamber 34 communicating with the output port 32 are interconnected through an oil passage 35. A proportional valve 36 having a cylindrical shape is vertically movably disposed within the valve chest 33. A cut valve 38 is disposed in an internal chamber $36_2$ of the proportional valve 36 and biased in a closed direction by a valve spring 37. The internal chamber $36_2$ communicates with the input port 31 through an oil hole $36_1$. When the cut valve 38 is in an open position shown in FIG. 6, the input port 31 communicates with the output port 32 through the oil hole $36_1$, the internal chamber $36_2$, around an outer periphery of the cut valve 38, the oil passage 35 and the oil chamber 34. The pressure control valve Cv further includes a pressure reduction piston 39 which faces at one of opposite ends thereof the oil chamber 34, and which has a step $39_1$ formed at its intermediate portion and disposed in a valve chest 41 communicating with the valve chest 33 via a oil passage 40.

A spring seat 44 carried on a stopper bolt 47 is provided within a spring chamber 42 connected to a lower portion of the valve chest 33. A valve spring 45 is provided in a compressed manner between the spring seat 44 and the proportional valve 36. An auxiliary valve member 46 is slidably received in the internal chamber $36_2$ of the proportional valve 36. Its lower end abuts against the spring seat 44 and at its upper end supports the valve spring 37 for biasing the cut valve 38. A spring chamber 50 is defined below the pressure reduction piston 39. A valve seat 52 carried on a stopper bolt 55 is provided within the spring chamber 50. A valve spring 54 is provided in a compressed manner between the spring seat 52 and a spring seat 53 which carries the lower end of the pressure reduction piston 39. An auxiliary valve member 56 is vertically movably disposed in an upper portion of the valve chest 33 and is capable of abutting against the upper end of the cut valve 38 to forcibly open the cut valve 38. An upper end of the auxiliary valve member 56 abuts against a spring seat 58 disposed in the spring chamber 57, and a valve spring 61 is provided in a compressed manner between the spring seat 58 and a spring seat 60 which is carried on a stopper bolt 62.

Figure 7:
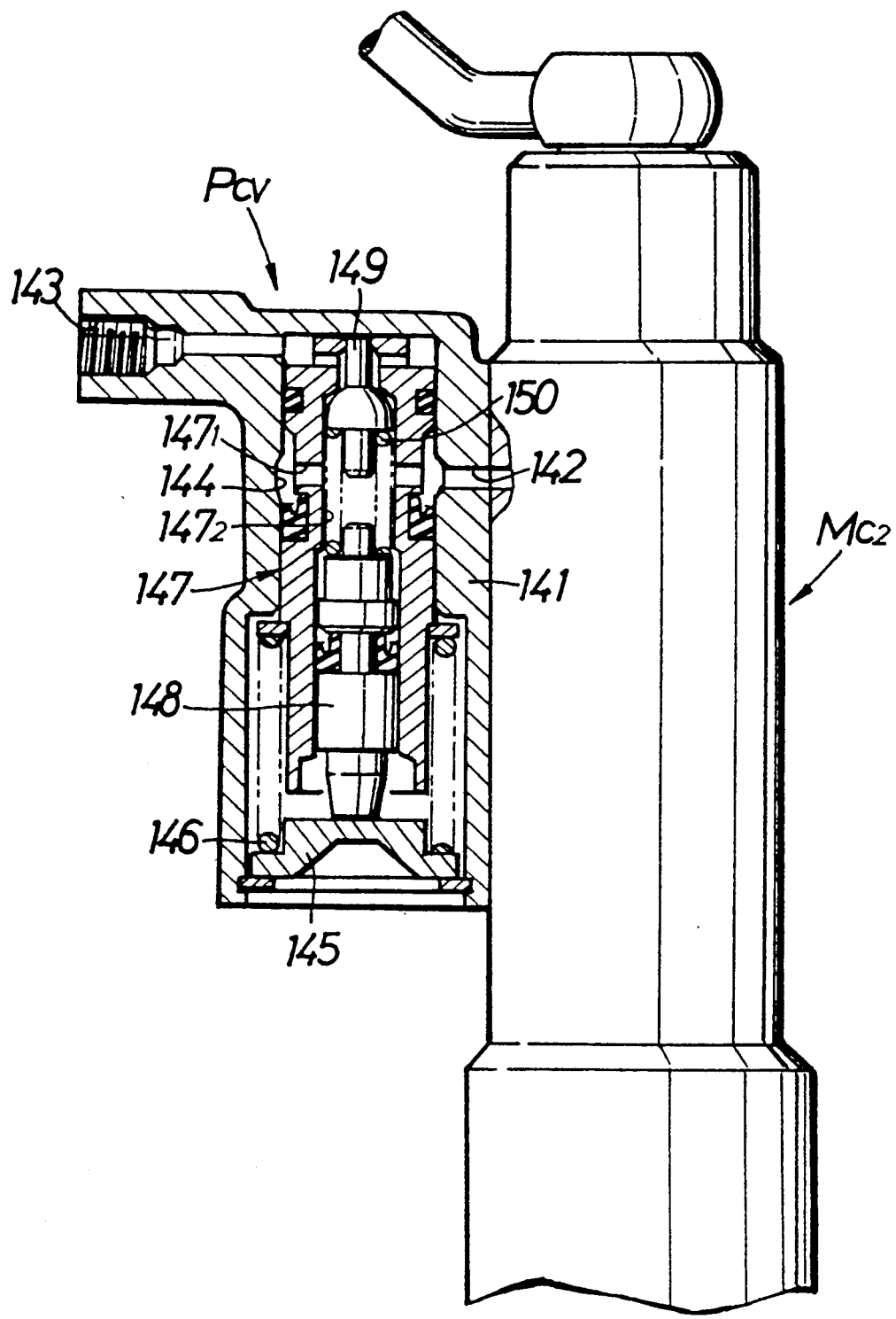

FIG. 7 illustrates the proportioning pressure reduction valve $P_{CV}$ which is integrally formed in the second master cylinder $M_{C2}$. The proportioning pressure reduction valve $P_{CV}$ has a similar structure to that incorporated in the aforementioned pressure control valve Cv. More specifically, a casing 141 of the proportioning pressure reduction valve $P_{CV}$ is provided with an input port 142 to which hydraulic braking pressure from the second master cylinder $M_{C2}$ is supplied and an output port 143 connected to the pot $P_2$ in the rear brake cylinder $B_{CR}$ of the rear wheel Wr. Further, a cylindrical proportional valve 147 is vertically movably disposed within a valve chest 144 defined in the casing 141 and biased upwardly by a valve spring 146 which is provided in a compressed manner between the proportional valve 147 and a spring seat 145. An auxiliary valve member 148, having a lower end abutting against the spring seat 145, and a cut valve 149 are disposed in an internal chamber $147_2$ which is provided within the proportional valve 147 and communicates with the input port 142 through an oil hole $147_1$. The cut valve 149 is biased in a closing direction thereof by a valve spring 150 which is provided in a compressed manner between the cut valve 149 and the auxiliary valve member 148.

The proportional valve 147 and the cut valve 149 are normally in their open positions shown in FIG. 7, so that the input port 142 is in communication with the output port 143 through the oil hole $147_1$, the internal chamber $147_2$ and around an outer periphery of the cut valve 149. If the hydraulic braking pressure transmitted from the second master cylinder $M_{C2}$ to the input port 142 is gradually increased, the proportional valve 147 is moved downwardly against a preset load of the valve spring 146 by the hydraulic braking pressure acting on an upper surface of the proportional valve 147, so that the valve 147 is brought into close contact with the cut valve 149 to temporarily cut off the communication between the input port 142 and the output port 143. However, if the hydraulic braking pressure transmitted to the input port 142 is further increased, the pressure in the internal chamber $147_2$ of the proportional valve 147 is increased to urge the proportional valve 147 upwardly, thereby putting the input port 142 and the output port 143 again into communication with each other. In this manner, the proportional valve 147 is vertically vibrated or reciprocated with an increase in hydraulic braking pressure above a predetermined value, thereby causing the clearance between the proportional valve 147 and the cut valve 149 to be intermittently opened and closed, so that the rate of increase in the hydraulic braking pressure transmitted to the brake cylinder $B_{CR}$ of the rear wheel Wr is reduced at a preset ratio.

Figure 8:
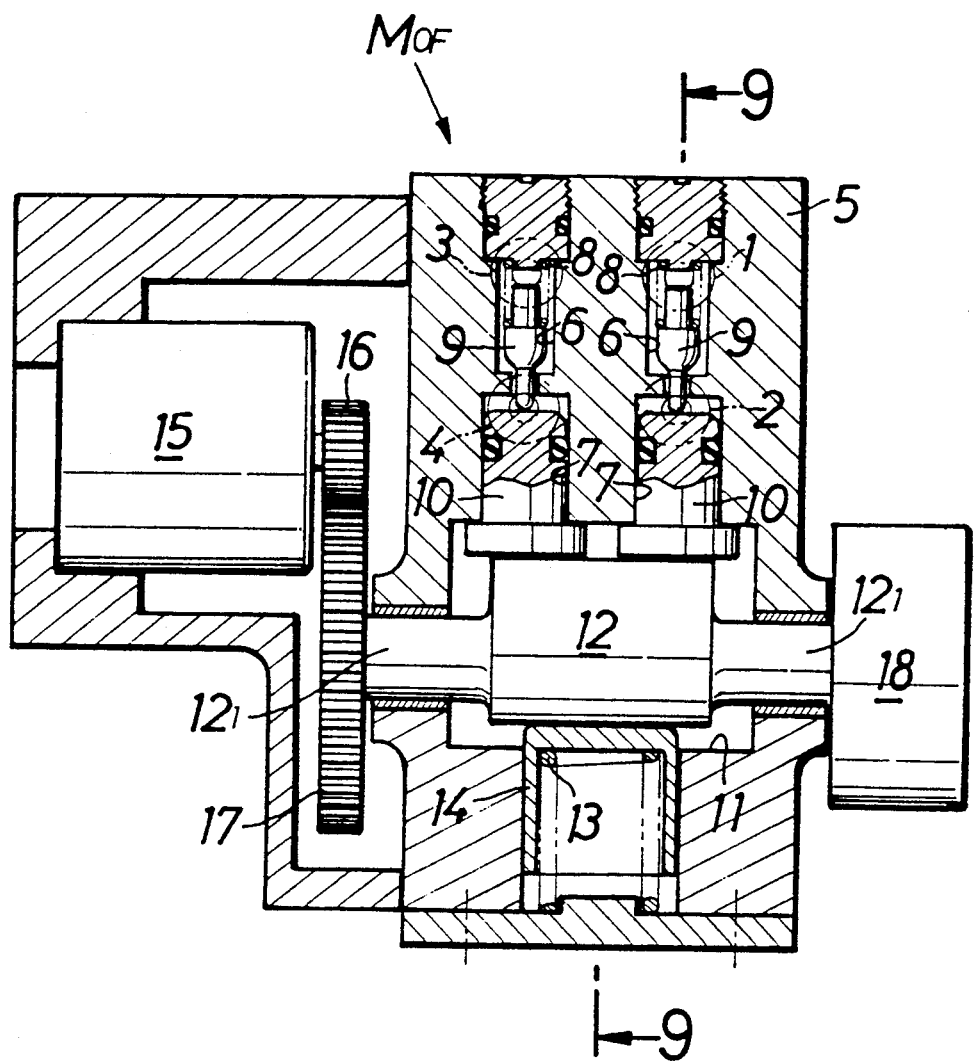
Figure 9:
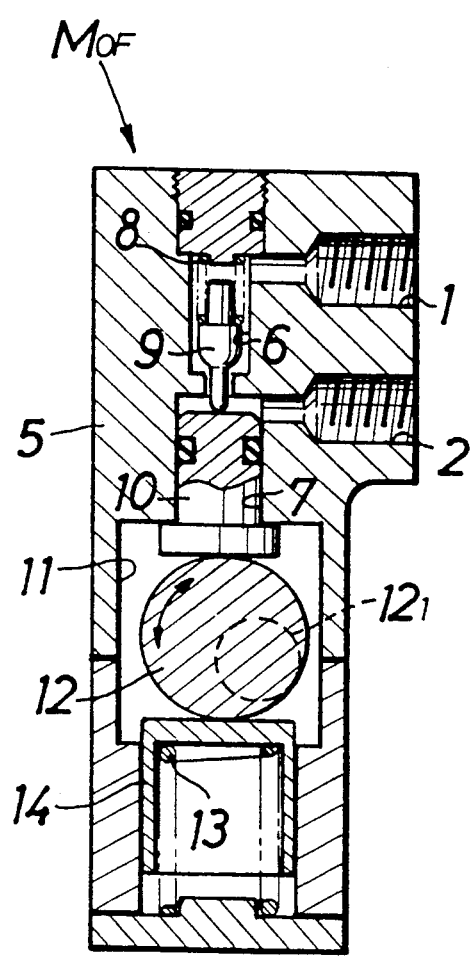

The structure of the front modulator $M_{OF}$ will now be described by referring to FIGS. 8 and 9. Since the rear modulator $M_{OR}$ has the same structure as that of the front modulator $M_{OF}$, any overlapping description thereof will be omitted here.

The front modulator $M_{OF}$, includes a housing 5 which is provided with an input port 1 connected to the first master cylinder $M_{C1}$ and an output port 3 connected to the pots $P_1$, $P_3$ of each of the brake cylinders $B_{CFL}$, $B_{CFR}$ of the front wheel Wf and also with an input port 3 connected to the second master cylinder $M_{C2}$ and an output port 4 connected to the pot $P_2$ of each of the brake cylinders $B_{CFL}$, $B_{CFR}$ of the front wheel Wf. Pressure reduction mechanisms having an identical structure with each other are disposed between the input port 1 and output port 2 and between the input port 3 and output port 4. More specifically, the input ports 1, 3 and the output ports 2, 4 are connected with each other through respective valve chambers 6 and cylinders 7 formed inside the housing 5. A cut valve 9 is contained in each valve chamber 6 and is biased by a valve spring 8 in a valve closing direction. A pressure reduction piston 10 is slidably received in each cylinder 7 with an upper end face of the piston 10 being placed in abutment against a lower end of a leg which is projected from a lower face of the cut valve 9.

A cam chamber 11 is formed in the housing 5 and is connected to lower parts of the cylinders 7. An eccentric cam 12 is contained in the cam chamber 11 such that opposite ends of the cam 12 are carried on the housing 5 by means of rotary shafts $12_1$. An urging member 14 which is biased upwardly by a return spring 13 is placed in abutment against a lower part of the eccentric cam 12. In turn, the cam 12 abuts against the lower faces of the pressure reduction pistons 10. With this arrangement, the pressure reduction pistons 10 are urged upwardly to push the legs of cut valves 9 upwardly, thereby forcibly opening the valves 9.

A motor 15 is provided and connected to the aforementioned electronic control unit U. The motor 15 has a drive gear 16 which is in mesh with a follower gear 17 provided on one rotary shaft $12_1$ of the eccentric cam 12. When the motor 15 is operated to rotate the eccentric cam 12 by a predetermined angle, the pressure reduction pistons 10 and cut valves 9 are moved up and down, causing the hydraulic braking pressure, which has been fed to the respective input ports 1, 3, to be output from the output ports 2, 4 at a predetermined reduction ratio. In this operation, a sensor 18 mounted on the other rotary shaft $12_1$ of the eccentric cam 12 operates and detects the rotated position of the cam, which detected value is fed back to the electronic control unit U.

As has been described above, two hydraulic braking pressure lines for operating the brake cylinders $B_{CFL}$, $B_{CFR}$ of the front wheel Wf, that is, the hydraulic braking pressure from the first master cylinder $M_{C1}$ and the hydraulic braking pressure from the second master cylinder $M_{C2}$, are subjected to pressure reduction operation at one common modulator $M_{OF}$. Similarly, two hydraulic braking pressure lines for operating the brake cylinder $B_{CR}$ of the rear wheel Wr are subjected to pressure reduction operation at one common modulator $M_{OR}$. This advantageously provides a reduction in the number of components and cost.

Description will now be made of the operation of the embodiment of the present invention having the abovedescribed construction.

If the brake lever L is operated in a normal state where the front and rear antilock modulators $M_{OF}$ and $M_{OR}$ are in an inoperative or rest state, the first master cylinder $M_{C1}$ generates a hydraulic braking pressure which passes through the inoperative front modulator $M_{OF}$ without modification and is transmitted to the two pots $P_1$ and $P_3$ of each of the left and right brake cylinders $B_{CFL}$ and $B_{CFR}$ for braking the front wheel Wf.

Simultaneously, the mechanical servo mechanism Ms generates a secondary hydraulic braking pressure and this pressure is transmitted to the two pots $P_1$ and $P_3$ of the braking cylinder $B_{CR}$ of the rear wheel Wr through the pressure control valve Cv and the inoperative rear modulator $M_{OR}$.

If the brake pedal P is depressed, the second master cylinder $M_{C2}$ generates a hydraulic braking pressure and this pressure is fed to the pots $P_2$ of left and right brake cylinders $B_{CFL}$ and $B_{CFR}$ of the front wheel Wf. The generated hydraulic braking pressure is simultaneously fed to the secondary port 132 of the mechanical servo mechanism Ms and then from the output port 129 to the pressure control valve Cv. It should be noted here that when both the brake lever L and brake pedal P are operated simultaneously, the larger of the hydraulic braking pressure generated by the second master cylinder $M_{C2}$ and the secondary hydraulic braking pressure generated by the mechanical servo mechanism Ms is output from the output port 129.

When the hydraulic braking pressure fed from the mechanical servo mechanism Ms through the operation of the brake lever L or the brake pedal P is transmitted to the input port 31 of the pressure control valve Cv, the hydraulic braking pressure is then output from the output port 32 after passing the oil hole $36_1$ and internal chamber $36_2$ of the proportional valve 36, around the outer periphery of the cut valve 38, the oil passage 35 and the oil chamber 34. The hydraulic braking pressure is thereafter fed to two pots $P_1$ and $P_3$ of the brake cylinder $B_{CR}$ of the rear wheel Wr through the inoperative rear modulator $M_{OR}$. In this operation, the braking forces applied to the front and rear wheels Wf and Wr can be increased in accordance with the amount of operation of the brake lever L or the brake pedal P and their distribution characteristic can be represented by a straight line connecting points O and A in FIG. 10.

Figure 10:
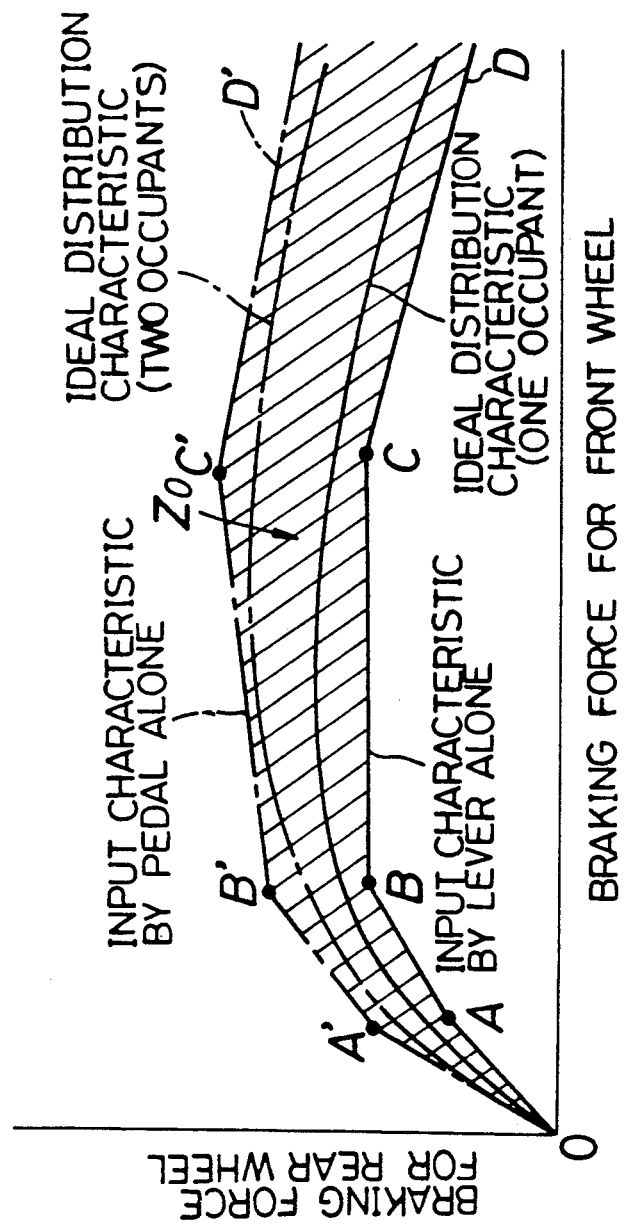

If the hydraulic braking pressure transmitted to the input port 31 of the pressure control valve Cv is gradually increased and the braking force for the rear wheel Wr reaches point A in FIG. 10, the proportional valve 36 is moved downwardly against a preset load of the valve spring 45 by the hydraulic braking pressure acting on the upper surface of the proportional valve 36. As a result, the proportional valve 36 is brought into close contact with the cut valve 38 so that the communication of the input port 31 with the output port 32 is temporarily cut off. If the hydraulic braking pressure to the input port 31 is further increased, however, the pressure in the internal chamber $36_2$ of the proportional valve 36 rises, thereby causing the proportional valve 36 to be pushed upwards so that the input and output ports 31 and 32 are again put into communication with each other. In this manner, the proportional valve 36 performs vibratory or reciprocal movements in accordance with an increase in the hydraulic braking pressure, causing the clearance between the proportional valve 36 and the cut valve 38 to be intermittently opened and closed and, therefore, the rate of increase in the hydraulic braking pressure transmitted to the brake cylinder $B_{CR}$ is reduced. The increased rate of the braking force for the rear wheel Wr is consequently decreased from point A as a boundary point in FIG. 10.

If the hydraulic braking pressure transmitted to the input port 31 of the pressure control valve Cv is further increased and the braking force for the rear wheel Wr reaches point B in FIG. 10, the auxiliary valve member 56 moves upwardly against a preset load of the valve spring 61. This causes the cut valve 38 biased by the valve spring 37 to move upwardly into contact with the proportional valve 36 and thereby causes communication between the input and output ports 31 and 32 to be cut off. Consequently, even if the hydraulic braking pressure to the input port 31 is thereafter increased, the hydraulic braking pressure transmitted from the output port 32 to the brake cylinder $B_{CR}$ is kept at a constant level.

If the hydraulic braking pressure transmitted to the input port 31 of the pressure control valve Cv is further increased and the braking force for the rear wheel Wr reaches point C in FIG. 10, such increased hydraulic braking pressure is transmitted through the oil passage 40 to the oil chamber 41 to move the pressure reduction piston 39 downwardly against a preset load of the valve spring 54. As a result, the upper end of the pressure reduction piston 39 is lowered to increase the volume of the oil chamber 34 so that the hydraulic braking pressure in the brake cylinder $B_{CR}$ is reduced.

Thus, the hydraulic braking pressure transmitted to the brake cylinder $B_{CR}$ of the rear wheel Wr by the action of the pressure control valve Cv, i.e., the braking force applied to the rear wheel Wr, varies at four stages; and the ratio of distribution of the braking forces to the front and rear wheels Wf and Wr varies as shown by a line O-A-B-C-D in FIG. 10. This insures that there is obtained a sharing characteristic which is extremely close to an ideal distribution characteristic. Moreover, the braking characteristic curve provided when the brake lever L is operated alone is set so as to extend just below and along an ideal distribution characteristic curve for riding by one occupant.

On the other hand, if the brake pedal P is operated alone, the second master cylinder $M_{C2}$ generates a hydraulic braking pressure which is transmitted through the inoperative front modulator $M_{OF}$ to the central pots $P_2$ of left and right brake cylinders $B_{CFL}$ and $B_{CFR}$ of the front wheel Wf and thereby applies a braking force to the wheel Wf. Following this braking action the mechanical servo mechanism Ms generates a secondary hydraulic braking pressure. This secondary pressure is fed through the pressure control valve Cv to the pots $P_1$ and $P_3$ of the brake cylinder $B_{Cr}$ of the rear wheel Wf and thereby applies a braking force to the wheel Wr simultaneously. When the hydraulic braking pressure generated by the second master cylinder $M_{C2}$ is larger than the secondary hydraulic braking pressure generated by the mechanical servo mechanism Ms, the hydraulic braking pressure of the second master cylinder $M_{C2}$ is directly fed to the pressure control valve Cv to brake the rear wheel Wr. In either case, the proportional valve 36, the cut valve 38 and the pressure reduction piston 39 provided in the pressure control valve Cv are operated sequentially in accordance with the increase in the hydraulic braking pressure transmitted from the mechanical servo mechanism Ms to the pressure control valve Cv, thereby suppressing the increase in the braking force for the rear wheel Wr.

Since the central pot $P_2$ of the brake cylinder $B_{CR}$ of the rear wheel Wr also receives the hydraulic braking pressure generated by the second master cylinder $M_{C2}$ via the inoperative rear modulator $M_{CR}$ and the proportioning pressure reduction valve $P_{CV}$ in response to the operation of the brake pedal P, the braking force obtained by this central pot $P_2$ is added to the braking force obtained by the front and rear pots $P_1$ and $P_3$. The braking force for the rear wheel Wr is increased by the added amount. The magnitude of the additional braking force applied to the rear wheel Wr by the operation of the brake pedal P is determined by the magnitude of the hydraulic braking pressure output from the proportioning pressure reduction valve $P_{CV}$. More specifically, the hydraulic braking pressure delivered by the proportioning pressure reduction valve $P_{CV}$ has the characteristic that it increases gradually in accordance with the amount of the brake pedal P depression at and after the boundary point. Therefore, as shown by a line 0-A'-B'-C'-D' in FIG. 10, the distribution characteristic curve provided when the brake pedal P is operated alone lies above the braking characteristic curve O-A-B-C-D provided when the brake lever L is operated alone. The difference between the two curves is gradually increased, i.e., the curves become divergent in accordance with an increase in the front braking force. The distribution curve provided when the brake pedal P is operated alone is established so as to lie above an ideal distribution characteristic curve for riding by two occupants. Consequently, when the brake lever L and the brake pedal P are simultaneously operated at a predetermined ratio, the braking characteristic curve can be obtained within a given region Zo indicated by oblique lines in FIG. 10 in accordance with the given ratio, and it is possible to make an actual characteristic curve extremely close to either of the ideal distribution characteristic curves for riding by one occupant and by two occupants.

If the wheel speed sensor S senses the onset of front wheel Wf lock, the electronic control unit U is activated and drives the motor 15 of the front antilock modulator $M_{OF}$. This rotates the eccentric cam 12 via the drive gear 16 and the follower gear 17 against the force of the return spring 13. The pair of pressure reduction pistons 10 then move downwardly with hydraulic braking pressure acting thereon while following the eccentric cam 12 so that the cut valves 9, urged by the valve springs 8, move downwardly along with the pressure reduction pistons 10. This cuts off the communication between the input ports 1, 3 and the output ports 2, 4. The hydraulic braking pressures from the first and second master cylinders $Mc_1$ and $Mc_2$ are thereby prevented from being supplied to the front wheel Wf. The downward movement of the pressure reduction pistons 10 is accompanied by an enlargement in the volume of the cylinders 7 to which the output ports 2, 4 are open. This causes a reduction in both of the hydraulic braking pressures to be fed to the pots $P_1$ and $P_3$ of the left and right brake cylinders $B_{CFL}$ and $B_{CFR}$ of the front wheel Wf and to the pots $P_2$ of these cylinders.

When the braking force applied to the front wheel Wf is reduced by the above operation and the wheel Wf is prevented from locking, the power to the motor 15 is cut off. The eccentric cam 12 returns to its original position and the pressure reduction pistons 10 rise back to their original positions responsive to the resilient force of the return spring 13. This permits a increase of the hydraulic braking pressure to the front wheel Wf. Starting and stopping of the motor 12 are repeated in this manner to hold the hydraulic braking pressure fed to the brake cylinders $B_{CFL}$ and $B_{CFR}$ of the front wheel Wf at an appropriate level, thereby preventing the front wheel Wf from locking.

It should be noted here that a reduction in the braking force to the front wheel Wf obtained in the aforementioned manner results in a reduction in the hydraulic braking pressure output from the mechanical servo mechanism Ms. Accordingly, the pots $P_1$ and $P_3$ of the brake cylinder $B_{CR}$ of the rear wheel Wr operated by the reduced hydraulic braking pressure apply a reduced braking force to the rear wheel Wr. The remaining central pot $P_2$ of the brake cylinder $B_{CR}$ of the rear wheel Wr is, however, supplied with hydraulic braking pressure from the proportioning pressure reduction piston $P_{CV}$ of the second master cylinder $Mc_2$ through the inoperative rear modulator $M_{OR}$ and hence, the braking force applied to the rear wheel Wr can be controlled minutely and delicately by adjusting the magnitude of the depression force to the brake pedal P. The braking force to the rear wheel Wr is thereby kept from lowering excessively.

If the wheel speed sensor S senses the onset of rear wheel Wr lock, the electronic control unit U actuates the rear modulator $M_{OR}$ to reduce both of the hydraulic braking pressures transmitted from the proportioning pressure reduction piston $P_{CV}$ of the second master cylinder $Mc_2$ and from the mechanical servo mechanism Ms through the pressure control valve Cv. This reduces the braking force applied to the rear wheel Wr. The actuation of the rear modulator $M_{OR}$ during this operation does not affect the magnitude of the braking force to the front wheel Wf.

As has been described, the braking forces to the front and rear wheels Wf and Wr can be controlled at an appropriate ratio so long as neither of the wheels show a locking tendency. When such a locking tendency appears in either of the wheels, the antilock modulators $M_{OF}$, $M_{OR}$ can be operated to prevent the braking force from becoming excessively large.

Although the embodiment of the present invention has been described above, it will be understood that the present invention is not limited thereto, and various modifications in design can be made without departing from the scope of the present invention defined in the appended claims. For example, while in the foregoing embodiment the hydraulic braking pressure of the first master cylinder $Mc_1$ operated by the brake lever L is supplied to the brake cylinder $B_{CR}$ of the rear wheel Wr via the mechanical servo mechanism Ms, pressure control valve Cv and rear modulator $M_{OR}$, it may alternatively be arranged that the hydraulic braking pressure of the first master cylinder $Mc_1$ operated by the brake lever L is supplied to the brake cylinder $B_{CR}$ of the rear wheel Wr Via the rear modulator $M_{OR}$ only. It should also be noted that the proportioning pressure reduction valve $P_{CV}$ which is incorporated in the second master cylinder $Mc_2$ operated by the brake pedal P is not indispensable and may be omitted where necessary. Moreover, the rear wheel wr may be equipped with a pair of left and right brake cylinders like the front wheel Wf.

What is claimed is:

1. A braking system for a motorcycle having front and rear wheels, comprising a first brake actuator;

a second brake actuator;

a first brake for braking one of the wheels and having a first plurality of brake applicators for applying braking force to the wheel, a first one or more of said first plurality of applicators being operated by hydraulic braking pressure from said first brake actuator and a second one or more of said first plurality of applicators being operated by hydraulic braking pressure from said second brake actuator;

a first antilock modulator interposed hydraulically between said first and second brake actuators and said first plurality of brake applicators to reduce the hydraulic braking pressure supplied to said first brake when the braking force applied to the wheel becomes excessive.

2. The braking system of claim 1 further comprises a second brake for braking the other of the wheels and having a second plurality of brake applicators for applying braking force to the other wheel, a first one or more of said second plurality of applicators being operated by hydraulic braking pressure from said first brake actuator and a second one or more of said second plurality of applicators being operated by hydraulic braking pressure from said second brake actuator;

a second antilock modulator interposed hydraulically between said first and second brake actuators and said second plurality of brake applicators to reduce the hydraulic braking pressure supplied to said second brake when the braking force applied to the other wheel becomes excessive.

3. The braking system according to claim 2, further comprising:

a hand-operated element for operating said first brake applicator; and a foot-operated element for operating said second brake applicator;

wherein the second brake is operable in response to the operation of the first brake.

4. The braking system according to claim 3, further comprising a high select means for selecting a larger one of the hydraulic braking pressures from the first and second brake actuators and distributing said larger hydraulic braking pressure to the second brake.

5. The braking system according to claim 3, wherein said first brake is mounted at the front wheel, said brake system further comprising means disposed on a front fork of the motorcycle for operating the second brake in response to said first brake.

6. The braking system according to claim 3, wherein the second brake includes a braking-force control means for controlling the force distribution of braking force to the front and rear wheels.

7. The braking system according to claim 6, wherein said braking-force control means boosts braking force to the rear wheel by a boost force equal to or greater than a preselected force responsive to the hydraulic braking pressure of the second actuator means applied to the braking-force control means.

8. The braking system according to claim 7, wherein said braking-force control means includes a proportional valve, a cut valve and a pressure reduction piston to generate a force distribution to the front and rear wheels in at least three stage steps.

9. The braking system according to claim 3, wherein one of said first brake and said second brake includes a pair of brake elements disposed on left and right sides of one of the front wheel and the rear wheel, both said brake elements of said pair of brake elements being actuated by either of said first actuator and said second actuator.

10. The braking system according to claim 9, wherein said pair of brake elements are mounted at the front wheel.

11. The braking system according to claim 3, wherein said first brake includes a pair of brake elements disposed on left and right sides of one of the front and right wheels, said second brake includes at least one brake element disposed on the other of the front and rear wheels, said brake elements of the first brake and said at least one brake element of the second brake each have said plurality of applicators, one of said first and second actuators actuating at least one and not all of said plurality of applicators in each said brake element of said pair of brake elements and in said at least one brake element, and the other of said first and second applicators actuating the remainder of said plurality of applicators in each said brake element of said pair of brake elements and actuating all of said plurality of applicators in said at least one brake.

12. The braking system according to claim 1, further comprising:

a hand-operated element for operating said first actuator; and a foot-operated element for operating said second actuator;

wherein said brake is operable by said first actuator to generate a first force distribution to the front wheel and the rear wheel and by said second actuator to generate a second force distribution to the front wheel and the rear wheel; and wherein a braking-force control means for controlling the force distribution of braking force to the front wheel and the rear wheel in accordance with respective operating forces of the first and second actuator, said braking-force control means generating a third force distribution to the front wheel and the rear wheel, said third force distribution being intermediate said first force distribution and said second force distribution when both said first and second actuators are actuated.

13. The braking system according to claim 12, wherein said second actuator is operable in response to the operation of said first actuator.

14. The braking system according to claim 12, wherein said first force distribution is selected for application of low braking force and said second force distribution is selected for application of high braking force.

15. The braking system according to claim 14, wherein said brake means includes a pair of brake elements disposed on left and right sides of one of the front wheel and the rear wheel, both said brake elements of said pair of brake elements being actuated by either of said first actuator and said second actuator.

16. The braking system according to claim 15, wherein said pair of brake elements are mounted at the front wheel.

17. The braking system according to claim 14, wherein said brake includes a pair of brake elements disposed on left and right sides of one of the front and rear wheels and at least one brake element disposed on the other of the front and rear wheels, said brakes of said pair of brake elements and said at least one brake element each have said plurality of applicators, one of said first and second actuators actuating at least one and not all of said plurality of applicators in each said brake element of said pair of brake elements and in said at least one brake element, and the other of said first and second input means actuating the remainder of said plurality of applicators in each said brake element of said pair of brake elements and actuating all of said plurality of applicators in said at least one brake element.

18. The braking system according to claim 12, wherein said braking-force control means includes a proportional valve, a cut valve and a pressure reduction piston to generate said third force distribution to the front and rear wheels in at least three stage steps.

* * * * *